Dec. 13, 1960
J. W. MARTIN
METHOD OF ELIMINATING WATER RESISTANT
COATING FROM BORE OF INJECTION WELLS
Filed May 1, 1958
2,964,109
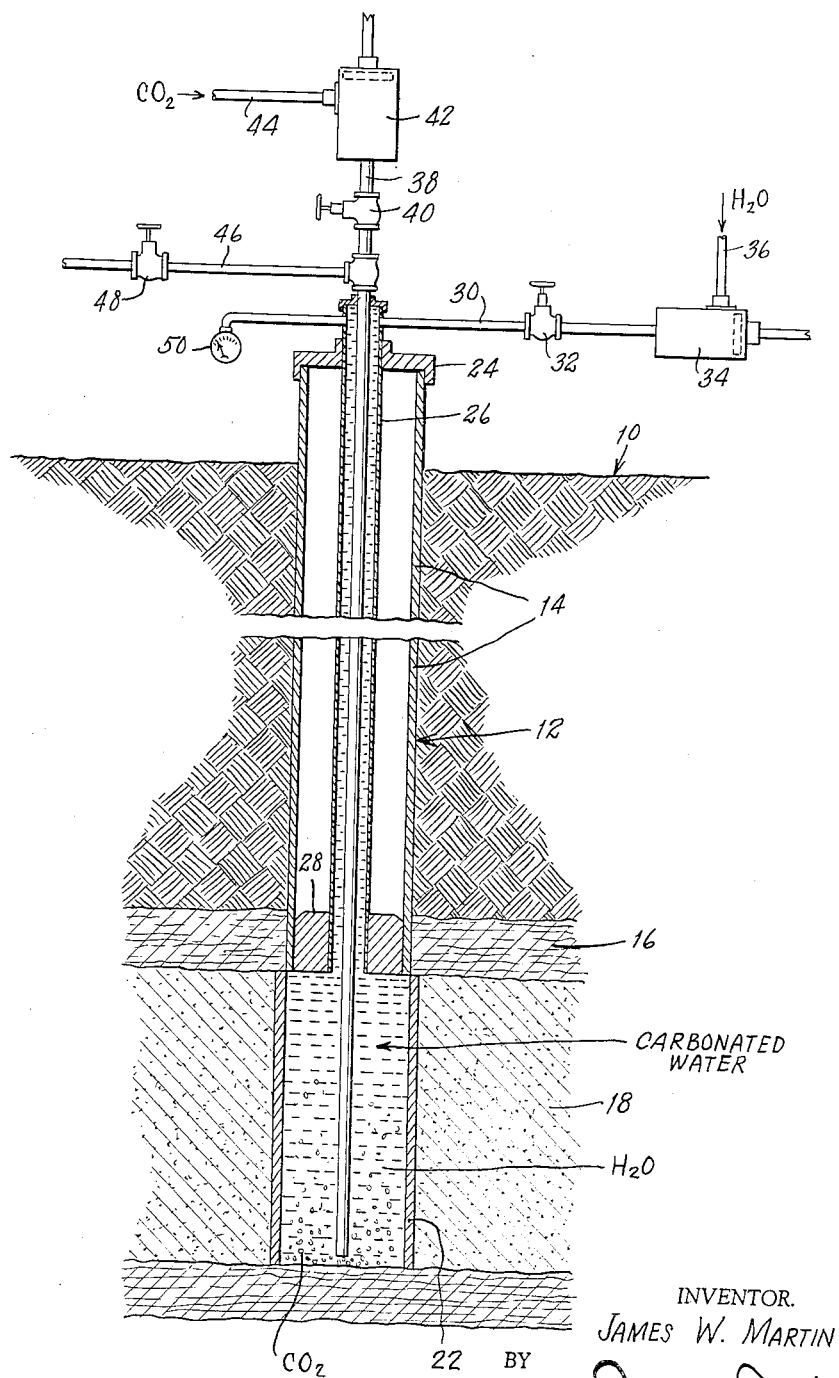
INVENTOR.
JAMES W. MARTIN
BY
Darby & Darby
ATTORNEYS

2,964,109
METHOD OF ELIMINATING WATER RESISTANT COATING FROM BORE OF INJECTION WELLS

James W. Martin, Yonkers, N.Y., assignor to Oil Recovery Corporation, New York, N.Y., a corporation of New York Filed May 1, 1958, Ser. No. 732,264

8 Claims. (Cl. 166—43)

The object of this invention is to provide a method of rendering the bore of injection wells used in the secondary recovery of petroleum from subterranean oil sands freely permeable to secondary recovery fluids.

Various detailed objects of the invention will be apparent from the following disclosure of the methods comprising this invention.

In the accompanying drawings the single figure is a diagrammatic illustration of an injection well and the apparatus associated therewith in order to apply the methods of this invention.

This invention relates to the secondary recovery of petroleum from subterranean oil sands by methods employing injection wells. These methods are commonly known in the art as methods of secondary recovery, and involve the introduction under pressure of fluids by means of specially drilled injection wells, into the oil sands to extract a portion of the oil remaining therein after primary production has been completed.

After the flow of oil has ceased from wells which have been drilled in an oil field to extract the underground oil, it is common in secondary recovery methods to drill water injection wells at preselected points in the field.

Fluids under pressure are introduced into the underground oil structure through these injection wells.

It frequently happens upon completion of the drilling of the injection wells that the secondary recovery fluid, be it water alone or water with other additives, does not readily flow from some of them into the surrounding oil structure, into which the well has been drilled. For example, the injectivity of a freshly drilled injection well may be less than 10 barrels of water per day even at pressures in excess of 600 p.s.i., which is considerably below a practical minimum for efficient operation.

Analysis and study indicates that in drilling the injection well a fluid impermeable skin forms on the wall of the bore, providing a barrier through which it is difficult to force the secondary recovery fluid even at substantial pressures. This relatively impervious skin or layer forms, during the drilling operation, as what geometrically may be considered to be a cylinder lying between the space of the bore and the oil structure in which the bore is formed. This skin or layer is believed to be formed by a combination of causes incident to the drilling of the injection well. It is composed of one or more of the materials already present in the ground, and those introduced during the drilling and/or formed as a result of the drilling operation in the presence of these various materials.

Frequently in the liquids of freshly drilled injection wells there are present alkaline earths, iron bearing salts and other chemicals, which tend to form a cementitious or gelatinous mass on the surface of the well bore in the oil sand. Such mass is probably augmented by the presence of the drilling mud, cement sometimes used in completing the well, rock dust from the drill, iron native to the oil sand, and possibly even iron formed by the wear of the drill. It will be seen then that some of these ingredients of the skin that is formed are native to the structure being drilled and others are introduced as a result of the drilling and other processing operations incident to the drilling of the injection well.

In any event, and regardless of the specific constituents and manner of formation of this skin or barrier, its presence is very real, as will more clearly appear hereinafter.

In prior practices in certain types of oil sand this skin has formerly been broken down by acidizing the well bore with, for example, a hydrochloric type acidizer, or by fracturing it with excessive pressure. For example, fracture is sometimes accomplished by injecting a mixture of water and sand under sufficient pressure into the well to fracture the oil sand and thus crack the skin.

There are difficulties and disadvantages encountered in using these methods, including their excessive expense and their frequent failure to do an effective job. Injection wells sometimes reseal themselves after acidizing and fracturing promotes channelling of the injected fluid which lowers the efficiency of oil recovery.

In accordance with the discovery comprising this invention, carbon dioxide and water are injected into the injection well upon completion of the drilling operation and held there under pressure until the pressure in the well begins to drop rapidly, indicating disintegration of this skin. Experience establishes that this period of pressurization with carbon dioxide and water may be relatively short, of the order of one to three hours, whereupon the permeability of the drilled hole to the passage of water into the surrounding oil sand suddenly increases. By way of example, it has been demonstrated that an injection well which prior to treatment in accordance with this process had an injection rate of no more than 10 barrels of water per day suddenly has that rate increased to 300 or more barrels of water per day at pressures no greater than the pressures which formerly had resulted in only low injectivity.

Since the carbonated water used for this purpose is suitable for passage through the oil structure, it can be followed by the introduction of secondary injection fluid and be caused to move through the formation and withdrawn through the output well or wells.

As an alternative procedure the pressure on the carbonated water in the well can be dropped and be allowed to blow back when the skin breaks down, and then the well is ready to receive whatever secondary fluid is to be used, as conditions require for the secondary recovery operation. One advantage of blowing the well back after treatment, in accordance with this invention, is to further aid in the removal of any mud or other material which may be in the well bore and which, therefore, tends to redeposit on the surface of the well bore if the pressure is maintained by the introduction of the secondary recovery fluid.

The amount of carbon dioxide used in this process is important because below certain minimum concentrations the process is not effective. Experiments indicate that there should be a minimum of 20 pounds of carbon dioxide per foot of vertical thickness of the oil sand being processed. This can be stated in another way, namely that for every foot this injection well is drilled into the oil structure there should be used 20 pounds of carbon dioxide. The pressures employed are not critical, and hence can be of the order of about a hundred pounds to more than 1000 p.s.i. at the face of the bore in the oil sand. The upper limit of the range is of course determined under each particular condition so as not to be great enough to lift the overburden.

Where the well bore or the sand contain water it is readily apparent that $CO_2$ alone may be injected.

In addition to being simple and inexpensive, this method is more effective than the acidizing and fracturing methods. It has the advantage that the carbonated water has no deleterious effect in the subsequent flooding of the oil sand and can, as stated above, be left in the well bore and passed in the oil structure along with the secondary recovery fluid.

In order to further teach the methods of this invention, reference will now be made to the single figure of the drawing. As diagrammatically illustrated therein, the injection well is drilled from the surface of the ground down through the overburden 10, into the oil sand 18. The drilling operation in a typical oil structure will include drilling through the cap rock 16, the oil sand or structure 18, and to the shale or rock formation which commonly underlies the oil sand.

During the drilling operation, or any other suitable time, the resulting bore 12 may be lined with a steel casing 14 which terminates at the top of the oil formation 18, as illustrated. At the end of the drilling operation, it frequently occurs that the bore in the oil structure 18 is encased with a skin, shell or barrier 22 of relatively fluid impervious aggregations, as previously suggested, the removal of which is essential to the required injectivity of the well for flooding purposes.

In accordance with this invention the casing 14 may be provided with a closure 24 constructed to receive a pair of telescoped pipes 26 and 38, the former of which terminates at the lower end of a sealing-off packer 28 positioned at the lower end of the casing 14. The inner pipe 38 may extend down to and terminate near the bottom of the hole in the oil structure 18.

A source of water is connected by a pipe 36 to the intake of a pump 34 of any suitable type. The discharge port of this pump is connected by a pipe 30, containing a suitable valve 32, to the pipe 26. Similarly, a source of carbon dioxide gas is connected by a pipe 44 to the intake of a suitable gas compressor 42. The output port of this pump is connected to the pipe 38, which includes a suitable valve 40. Between the casing 14 and the valve 40, the pipe 38 is provided with a discharge line 46 having a suitable valve 48.

In accordance with the method herein disclosed water may be pumped into the well bore below the packer 28, through the pipe 26, to build up the required pressure, as discussed above. Carbon dioxide is then pumped into the water in the bore below the packer 28, through the pipe 38, and is discharged from its lower end below the packer. The water thus becomes gradually carbonated and when the quantity of carbon dioxide introduced into the water falls within the limits discussed above, the supply of carbon dioxide can be cut off. The pressurized carbonated water is then held under pressure below the packer 28 until the skin or barrier 22 breaks down, as indicated by a pressure gauge 50 for example, with the result that the carbonated water then passes into the oil sands 18 and can be followed with the required quantity of secondary recovery fluid, all in accordance with well known secondary recovery methods.

As an alternative, after the skin 22 has been subjected to the action of the pressurized carbonated water for a suitable period of time, the pressure below the packer can be released by opening valve 48 to blow the well back. At this time, valves 32 and 40 are preferably closed and the pumps are not operating. This sudden drop in pressure gives the final impetus to the destruction of the skin 22, causing the remnants of the skin to fall into the bore. It also avoids the tendency of the pressurized carbonated water to force the constituents of the skin and any other additional materials such as mud which may be present, into the pores of the oil sand wall formed by the drilling operation. The subsequent introduction of the secondary recovery fluid may then proceed in accordance with the various well known practices.

For emphasis again, it is stated that from experience it has been found possible to increase the permeability of injection wells, subject to the skin formation difficulty, from 10 to over 300 barrels of water per day even at comparable pressures.

From the above description it will be apparent to those skilled in the art that the subject matter of this invention is capable of some variation in detail, and it is proposed, therefore, that the scope of protection afforded hereby be determined by the appended claims and not limited to the specific embodiment disclosed for illustrative purposes.

What is claimed is:

1. A method of increasing the transfer of an oil recovery fluid from an injection well into the surrounding oil bearing formation in which the well has been formed and wherein a relatively fluid impervious skin has been deposited on the surface of said oil bearing formation, which comprises introducing under pressure water and carbon dioxide adjacent to said fluid impervious skin said carbon dioxide used being at least 20 pounds per foot of vertical thickness of said oil bearing formation, continuing the injection of water and carbon dioxide to maintain the pressure until said skin has been destroyed and thereafter injecting an oil recovery fluid into the well.

2. In the method of claim 1 said carbon dioxide and water being injected at a pressure in excess of 100 p.s.i.

3. In the method of claim 1, the additional step of back flowing the well by suddenly reducing the pressure on the water and carbon dioxide.

4. In the method of claim 1, the additional step of back flowing the well by suddenly reducing the pressure on the water and carbon dioxide and withdrawing the water and carbon dioxide from the well.

5. A method of increasing the transfer of an oil recovery fluid from an injection well which contains water into the surrounding oil bearing formation in which the well has been formed and wherein a relatively fluid impervious skin has been deposited on the surface of said oil bearing formation, which comprises introducing under pressure carbon dioxide adjacent to said fluid impervious skin said carbon dioxide used being at least 20 pounds per foot of vertical thickness of said oil bearing formation, continuing the injection of carbon dioxide to maintain the pressure until said skin has been destroyed and thereafter injecting an oil recovery fluid into the well.

6. In the method of claim 5 said carbon dioxide being injected at a pressure in excess of 100 p.s.i.

7. In the method of claim 5, the additional step of back flowing the well by suddenly reducing the pressure on the carbon dioxide.

8. In the method of claim 5, the additional step of back flowing the well by suddenly reducing the pressure on the carbon dioxide and withdrawing the carbon dioxide and water from the well.

References Cited in the file of this patent

UNITED STATES PATENTS

| Number | Name | Date |
| --- | --- | --- |
| 656,466 | Minor | Aug. 21, 1900 |
| 1,511,067 | Russel | Oct. 7, 1924 |
| 2,623,595 | West | Dec. 30, 1952 |
| 2,768,694 | Moll et al | Oct. 30, 1956 |
| 2,811,209 | Elkins | Oct. 29, 1957 |
| 2,875,831 | Martin et al | Mar. 3, 1959 |
| 2,875,832 | Martin et al. | Mar. 3, 1959 |
| 2,875,833 | Martin | Mar. 3, 1959 |

OTHER REFERENCES

"Flooding With Carbonated Water," by J. W. Martin, The Oil And Gas Journal, vol. 50, Aug. 30, 1951, pgs. 70, 71, 86 and 87. Copy in Div. 49.

Notice of Adverse Decision in Interference

In Interference No. 92,565 involving Patent No. 2,964,109, J. W. Martin, METHOD OF ELIMINATING WATER RESISTANT COATING FROM BORE OF INJECTION WELLS, final judgment adverse to the patentee was rendered Nov. 5, 1964, as to claims 1, 2, 3, 4, 5, 6, 7 and 8.

[*Official Gazette March 30, 1965.*]